US012326918B2

(12) United States Patent
O'Donoghue et al.

(10) Patent No.: US 12,326,918 B2
(45) Date of Patent: Jun. 10, 2025

(54) CROSS-TEMPORAL ENCODING MACHINE LEARNING MODELS

(71) Applicant: Optum Services (Ireland) Limited, Dublin (IE)

(72) Inventors: Kieran O'Donoghue, Dublin (IE); Neill Michael Byrne, Dublin (IE); Michael J. McCarthy, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 816 days.

(21) Appl. No.: 17/451,270

(22) Filed: Oct. 18, 2021

(65) Prior Publication Data
US 2023/0122121 A1   Apr. 20, 2023

(51) Int. Cl.
*G06F 18/22* (2023.01)
*G06F 18/214* (2023.01)
*G06N 20/00* (2019.01)

(52) U.S. Cl.
CPC ............ *G06F 18/22* (2023.01); *G06F 18/214* (2023.01); *G06N 20/00* (2019.01)

(58) Field of Classification Search
CPC ........................................ G06F 18/22
USPC .......................................... 706/12
See application file for complete search history.

(56) References Cited

U.S. PATENT DOCUMENTS

| | | | | |
|---|---|---|---|---|
| 6,788,965 | B2 * | 9/2004 | Ruchti | A61B 5/1459 600/316 |
| 8,036,925 | B2 * | 10/2011 | Choubey | G06Q 10/0631 705/7.12 |
| 8,321,251 | B2 * | 11/2012 | Opalach | G06Q 10/06 705/7.42 |

(Continued)

FOREIGN PATENT DOCUMENTS

| | | |
|---|---|---|
| CN | 112185569 A | 1/2021 |
| CN | 113241135 A | 8/2021 |

(Continued)

OTHER PUBLICATIONS

T. Sarwar, et al. "The secondary use of electronic health records for data mining: data characteristics and challenges", ACM Com. Surv., 55 (2) (2023), p. 33 (Year: 2023).*

(Continued)

*Primary Examiner* — Reza Nabi
(74) *Attorney, Agent, or Firm* — Alston & Bird LLP

(57) ABSTRACT

Various embodiments of the present invention provide methods, apparatus, systems, computing devices, computing entities, and/or the like for perform predictive data analysis operations. For example, certain embodiments of the present invention utilize systems, methods, and computer program products that perform predictive data analysis operations by using a cross-temporal encoding machine learning model, such as a cross-temporal encoding machine learning model that is generated by using a target intervention classification machine learning model to map outputs of the cross-tem- (Continued)

poral encoding machine learning model to historical target intervention labels, thus enabling supervised training of the cross-temporal encoding machine learning without the need for ground-truth data corresponding to the output of the cross-temporal encoding machine learning model.

18 Claims, 8 Drawing Sheets

(56) References Cited

U.S. PATENT DOCUMENTS

| | | | | |
|---|---|---|---|---|
| 8,751,266 | B2* | 6/2014 | Stang | G16H 50/70 705/2 |
| 9,147,041 | B2* | 9/2015 | Amarasingham | G16H 10/60 |
| 9,324,119 | B2* | 4/2016 | Singh | G06Q 50/265 |
| 9,836,599 | B2* | 12/2017 | Sheldon | G06F 21/554 |
| 10,231,622 | B2* | 3/2019 | Soyao | G16H 50/20 |
| 10,249,389 | B2* | 4/2019 | Athey | G16H 50/30 |
| 10,404,526 | B2* | 9/2019 | Prabhakara | H04L 41/069 |
| 10,496,788 | B2* | 12/2019 | Amarasingham | G16H 50/50 |
| 10,579,928 | B2* | 3/2020 | Wang | G06N 7/00 |
| 10,692,589 | B2* | 6/2020 | Mueller-Wolf | G16H 80/00 |
| 10,729,502 | B1* | 8/2020 | Wolf | A61B 34/37 |
| 10,888,281 | B2* | 1/2021 | Shah | A61B 5/6861 |
| 10,943,072 | B1* | 3/2021 | Jaganmohan | G06N 5/041 |
| 11,065,079 | B2* | 7/2021 | Wolf | G06V 20/20 |
| 11,081,234 | B2* | 8/2021 | Pappada | G16H 50/20 |
| 11,106,442 | B1* | 8/2021 | Hsiao | H04L 67/02 |
| 11,116,587 | B2* | 9/2021 | Wolf | G06F 3/048 |
| 11,562,294 | B2 | 1/2023 | Seo et al. | |
| 2003/0060692 | A1* | 3/2003 | Ruchti | A61B 5/441 600/310 |
| 2005/0091084 | A1* | 4/2005 | McGuigan | G16H 20/10 705/3 |
| 2006/0206359 | A1* | 9/2006 | Stang | G16H 40/67 705/2 |
| 2008/0214904 | A1* | 9/2008 | Saeed | A61B 5/0006 705/2 |
| 2009/0182594 | A1* | 7/2009 | Choubey | G06Q 10/06 705/7.33 |
| 2011/0071363 | A1* | 3/2011 | Montijo | G06Q 10/10 600/300 |
| 2013/0035976 | A1* | 2/2013 | Buffett | G06F 17/40 705/7.26 |
| 2013/0110576 | A1* | 5/2013 | Roy | G06Q 10/06 705/7.26 |
| 2013/0172764 | A1* | 7/2013 | Buckley | A61B 5/4842 600/509 |
| 2013/0185097 | A1* | 7/2013 | Saria | G06Q 10/00 705/3 |
| 2014/0074509 | A1* | 3/2014 | Amarasingham | G16H 50/70 705/3 |
| 2014/0279641 | A1* | 9/2014 | Singh | G06Q 10/06 705/325 |
| 2015/0213206 | A1* | 7/2015 | Amarasingham | G16H 50/30 705/2 |
| 2015/0213224 | A1* | 7/2015 | Amarasingham | G16H 50/30 705/2 |
| 2015/0216413 | A1* | 8/2015 | Soyao | H04L 67/12 709/204 |
| 2015/0286792 | A1* | 10/2015 | Gardner | G06Q 40/08 705/3 |
| 2015/0289821 | A1* | 10/2015 | Rack-Gomer | A61B 5/14532 600/300 |
| 2016/0267268 | A1* | 9/2016 | Sheldon | G06Q 10/0635 |
| 2017/0061093 | A1* | 3/2017 | Amarasingham | G16H 10/60 |
| 2017/0091320 | A1* | 3/2017 | Psota | G06F 16/3337 |
| 2017/0111245 | A1* | 4/2017 | Ishakian | G06Q 10/0633 |
| 2017/0124269 | A1* | 5/2017 | McNair | G16H 50/20 |
| 2017/0357771 | A1* | 12/2017 | Connolly | G16H 50/30 |
| 2018/0083825 | A1* | 3/2018 | Prabhakara | H04L 41/5019 |
| 2018/0211727 | A1* | 7/2018 | Zarkoob | G06N 20/10 |
| 2018/0225314 | A1* | 8/2018 | Devarao | G06F 16/2455 |
| 2018/0330824 | A1* | 11/2018 | Athey | G16B 40/00 |
| 2018/0374580 | A1* | 12/2018 | Gupta | G16H 50/30 |
| 2019/0034590 | A1* | 1/2019 | Oren | G06N 3/044 |
| 2019/0034591 | A1* | 1/2019 | Mossin | G06N 3/08 |
| 2019/0036970 | A1* | 1/2019 | Shih | H04L 67/141 |
| 2019/0108912 | A1* | 4/2019 | Spurlock, III | A61P 25/28 |
| 2019/0147343 | A1* | 5/2019 | Lev | G06F 7/023 706/25 |
| 2019/0172587 | A1* | 6/2019 | Park | G16B 20/00 |
| 2019/0377818 | A1* | 12/2019 | Andritsos | G06F 16/2465 |
| 2020/0043612 | A1* | 2/2020 | McNair | G16H 50/30 |
| 2020/0074573 | A1* | 3/2020 | Op Den Buijs | G06Q 10/10 |
| 2020/0160995 | A1* | 5/2020 | Kenig | G16H 50/20 |
| 2020/0185085 | A1* | 6/2020 | Mavrieudus | G16H 30/40 |
| 2020/0272919 | A1* | 8/2020 | Haimson | G16H 50/20 |
| 2020/0293527 | A1* | 9/2020 | Srivastav | G06F 16/285 |
| 2020/0356846 | A1* | 11/2020 | Saripalli | G06N 3/045 |
| 2020/0396231 | A1* | 12/2020 | Krebs | H04L 63/1425 |
| 2020/0411176 | A1* | 12/2020 | Hadorn | G16H 40/67 |
| 2021/0082575 | A1* | 3/2021 | Ji | G16H 40/20 |
| 2021/0090733 | A1* | 3/2021 | Dibari | G16H 15/00 |
| 2021/0142199 | A1* | 5/2021 | McCarthy | G16H 50/30 |
| 2021/0201184 | A1* | 7/2021 | Scheepens | G06F 18/217 |
| 2021/0241137 | A1* | 8/2021 | Jain | G16H 10/20 |
| 2021/0279644 | A1* | 9/2021 | Givental | G06F 18/2321 |
| 2021/0286815 | A1* | 9/2021 | Aylett | G06F 16/24526 |
| 2021/0302953 | A1* | 9/2021 | Zhou | G05B 23/0283 |
| 2021/0390668 | A1* | 12/2021 | Ren | G06T 5/70 |
| 2022/0051796 | A1 | 2/2022 | Zhu et al. | |
| 2022/0103589 | A1* | 3/2022 | Shen | G06N 20/00 |
| 2022/0291966 | A1* | 9/2022 | Masood | G06F 3/0486 |
| 2022/0292339 | A1* | 9/2022 | Byrne | G06N 3/044 |
| 2022/0327404 | A1* | 10/2022 | Godden | G06N 20/00 |
| 2023/0024366 | A1* | 1/2023 | Krutka | G16H 10/60 |
| 2023/0075176 | A1* | 3/2023 | McCarthy | G16H 50/20 |
| 2023/0104028 | A1 | 4/2023 | Wang et al. | |
| 2023/0119186 | A1* | 4/2023 | O'Donoghue | G06N 3/08 706/21 |
| 2023/0122121 | A1* | 4/2023 | O'Donoghue | G06F 18/22 706/12 |
| 2023/0140828 | A1* | 5/2023 | Durvasula | G06N 5/046 705/7.37 |
| 2023/0376532 | A1* | 11/2023 | McCarthy | G06F 16/84 |
| 2024/0119057 | A1* | 4/2024 | Unsal | G06F 16/38 |
| 2024/0207485 | A1* | 6/2024 | Tran | A61L 27/40 |
| 2024/0211779 | A1* | 6/2024 | Conchuir | G06N 5/04 |
| 2024/0273263 | A1* | 8/2024 | James | G06F 30/27 |
| 2024/0355460 | A1* | 10/2024 | Sobolewski | G16H 40/20 |
| 2024/0362068 | A1* | 10/2024 | O Conchuir | G06F 9/5005 |
| 2024/0378385 | A1* | 11/2024 | Byrne | G06V 30/10 |
| 2024/0378516 | A1* | 11/2024 | Waldron | G16H 40/00 |
| 2024/0379160 | A1* | 11/2024 | Harari | G11C 5/063 |
| 2024/0403628 | A1* | 12/2024 | O Conchuir | G06N 20/00 |

FOREIGN PATENT DOCUMENTS

| | | |
|---|---|---|
| EP | 3767636 A1 | 1/2021 |
| WO | 2019/201997 A1 | 10/2019 |
| WO | 2021/115835 A1 | 6/2021 |

OTHER PUBLICATIONS

Darabi S. et al. "TAPER: Time-aware patient EHR representation", IEEE J. Biomed. Health Inf. (2020) (Year: 2020).*
Darabi, Sajad et al. "TAPER: Time-Aware Patient EHR Representation," IEEE Journal of Biomedical and Health Informatics, vol. 24, Issue 11, pp. 3268-3275, Apr. 3, 2020 (ePub: Nov. 2020), DOI: 10.1109/JBHI.2020.2984931.
International Search Report and Written Opinion for International Application No. PCT/US2023/018975, dated Aug. 7, 2023, (15 pages), European Patent Office, Rijswijk, Netherlands.
Sarwar, Tabinda et al. "The Secondary Use Of Electronic Health Records For Data Mining: Data Characteristics and Challenges," ACM Computing Surveys, vol. 55, No. 2, Article 33, pp. 33:1-33:40, Jan. 18, 2022, DOI: 10.1145/3490234.

(56) References Cited

OTHER PUBLICATIONS

Assale, Michela et al. "The Revival of The Notes Field: Leveraging The Unstructured Content In Electronic Health Records," Frontiers In Medicine, vol. 6, Article 66, Apr. 17, 2019, pp. 1-23, DOI: 10.3389/fmed.2019.00066.
Bayramli, Ilkin et al. "Predictive Structured-Unstructured Interactions In EHR Models: A Case Study of Suicide Prediction," Nature Partner Journals|Digital Medicine, vol. 5, No. 15, Jan. 27, 2022, pp. 1-11, DOI: 10.1038/s41746-022-00558-0.
Camargo, Manuel et al. "Discovering Generative Models From Event Logs: Data-Driven Simulation vs Deep Learning," arXiv preprint arXiv:2009.03567v1 [cs.AI], Sep. 8, 2020, (12 pages).
Jacobi, Corinna et al. "Coming To Terms With Risk Factors For Eating Disorders—Application Of Risk Terminology and Suggestions For A General Taxonomy," Psychological Bulletin, vol. 130, No. 1, (2004), pp. 19-65, DOI: 10.1037/0033.2909.130.1.19.
Maslach, David et al. "Noise As Signal In Learning From Rare Events," Organization Science, vol. 29, No. 2, pp. 225-246, Apr. 2, 2018, DOI: 10.1287/orsc.2017.1179, ISSN: 1047-7039 (print), ISSN: 1526-5455 (online).
Miotto, Riccardo et al. "Deep Patient: An Unsupervised Representation To Predict The Future of Patients From The Electronic Health Records," Scientific Reports, vol. 6, No. 26094, May 17, 2016, pp. 1-10, DOI: 10.10.8/srep26094.
Mogren, Olof. "C-RNN-GAN: Continuous Recurrent Neural Networks With Adversarial Training," arXiv preprint arXiv:1611.09904 [cs.AI], Nov. 29, 2016, (6 pages).
Mukherjee, Ujal Kumar. "Managing The Risks and Potential of High-Tech Innovations-In-Use—Predictive Analytic Modeling With Big Data and A Longitudinal Field Study," A Dissertation Submitted to the Faculty of the Graduate School of the University of Minnesota, Jul. 2015, (165 pages).
Nolle, Timo et al. "DeepAlign: Alignment-Based Process Anomaly Correction Using Recurrent Neural Networks," In: Dustdar S., Yu E., Salinesi C., Rieu D., Pant V. (eds) Advanced Information Systems Engineering. CAiSE 2020. Lecture Notes in Computer Science, vol. 12127, pp. 319-333, Springer, Cham. DOI: 10.1007/978-3-030-49435-3_20.
Syring, Anja F. et al. "Evaluating Conformance Measures In Process Mining Using Conformance Propositions," In book: Transactions on Petri Nets and Other Models of Concurrency XIV, Nov. 21, 2019, pp. 192-221, Springer, Berlin, Heidelberg. DOI: 10.1007/978-3-662-60651-3_8.
Tello-Leal Edgar et al. "Predicting Activities in Business with LSTM Recurrent Neural Networks," In 2018 ITU Kaleidoscope: Machine Learning for a 5G Future (ITU K), Nov. 26, 2018, (7 pages). IEEE. DOI: 10.23919/ITU-WT.2018.8598069.
Theis, Julian et al. "Adversarial System Variant Approximation To Quantify Process Model Generalization," IEEE Access, vol. 8, Oct. 23, 2020, pp. 194410-194427. DOI: 10.1109/ACCESS.2020.3033450.
Xia, Bin et al. "LogGAN: A Log-Level Generative Adversarial Network For Anomaly Detection Using Permutation Event Modeling," Information Systems Frontiers, vol. 23, No. 2, Jun. 16, 2020, (14 pages). DOI: 10.1007/s10796-020-10026-3.
Zhang, Dongdong et al. "Combining Structured and Unstructured Data For Predictive Models: A Deep Learning Approach," BMC Medical Informatics and Decision Making, vol. 20, No. 280, Oct. 29, 2020, pp. 1-11, DOI: 10.1186/s12911-020-01297-6.
Non-Final Office Action for U.S. Appl. No. 17/469,005, dated Jan. 02, 2024, (46 pages), United States Patent and Trademark Office.
Advisory Action (PTOL-303) Mailed on Nov. 8, 2024 for U.S. Appl. No. 17/469,005, 3 page(s).
Choi et al, Retain: An Interpretable Predictive Model for Healthcare using Reverse Time Attention Mechanism, 2016, Advances in Neural Information Processing Systems, pp. 3512-3520 (Year: 2016).
Final Rejection Mailed on Aug. 23, 2024 for U.S. Appl. No. 17/469,005, 41 page(s).
Gao et al, Stage Net: Stage-Aware Neural Networks for Health Risk Prediction, 2020, WWW '20: Proceedings of The Web Conference 2020, pp. 530-540 (Year: 2020).
Hardt et al, Explaining an increase in predicted risk for clinical alerts, 2020, CHIL '20: Proceedings of the ACM Conference on Health, Inference, and Learning, pp. 80-89 (Year: 2020).
Non-Final Rejection Mailed on Aug. 27, 2024 for U.S. Appl. No. 17/196,543, 34 page(s).
Non-Final Rejection Mailed on Jan. 2, 2024 for U.S. Appl. No. 17/469,005, 46 page(s).
Notice of Allowance and Fees Due (PTOL-85) Mailed on Sep. 25, 2024 for U.S. Appl. No. 17/663,771, 12 page(s).
Marafino, Ben J. et al. "Predicting Preventable Hosptial Readmissions With Causal Machine Learning," Health Services Research, vol. 55, No. 6, Oct. 30, 2020, pp. 993-1002, DOI: 10.1111/1475-6773.13586, PMCID: PMC7704477, PMID: 33125706.
Wenke, Sam et al. "Contextual Recurrent Neural Networks," arXiv Preprint arXiv:1902.03455v1 [cs.LG] Feb. 9, 2019, (7 pages).
Non-Final Rejection Mailed on May 23, 2024 for U.S. Appl. No. 17/663,771, 42 page(s).
Basiri et al., "ABCDM: An Attention-based Bidirectional CNN-RNN Deep Model for sentiment analysis", Future Generation Computer Systems, vol. 115, Feb. 2021, pp. 279-294 (Year: 2021).
Daras et al, "Your Local GAN: Designing Two Dimensional Local Attention Mechanisms for Generative Models", Proceedings of the IEEE/CVF Conference on Computer Vision and Pattern Recognition (CVPR), 2020, pp. 14531-14539 (Year: 2020).
Final Rejection Mailed on Jan. 15, 2025 for U.S. Appl. No. 17/196,543, 28 page(s).
Liu et al, "DSTP-RNN: A dual-stage two-phase attention-based recurrent neural network for long-term and multivariate time series prediction", Expert Systems with Applications, vol. 143, Apr. 1, 2020, 113082 (Year: 2020).
Notice of Allowance and Fees Due (PTOL-85) Mailed on Jan. 14, 2025 for U.S. App. No. 17/663,771, 9 pages(s).
Behera, et al., "Generative Adversarial Networks Based Remaining useful Life Estimation for IIoT," Computers & Electrical Engineering 92 (2021): 107195. (Year: 2021).
Dangut, et al., "Rare Failure Prediction using an Integrated Autoencoder and Bidirectional Gated Recurrent Unit Network." IFAC-PapersOnLine 53.3 (2020): 276-282. (Year: 2020).
Elsheikh, et al, "Bidirectional Handshaking LSTM for Remaining useful Life Prediction," Neurocomputing 323 (2019): 148-156. (Year: 2019).
Non-Final Rejection Mailed on Feb. 27, 2025 for U.S. Appl. No. 17/469,005, 56 page(s).
Notice of Allowance and Fees Due (PTOL-85) Mailed on Feb. 7, 2025 for U.S. Appl. No. 17/504,657, 8 page(s).
Notice of Allowance and Fees Due (PTOL-85) Mailed on Feb. 13, 2025 for U.S. Appl. No. 17/504,657, 3 page(s).

* cited by examiner

| Chronic Disease | Use Case Risk Profile $P_u$ |
|---|---|
| Chronic Disease 1 | 0.7 |
| Chronic Disease 2 | 0.65 |
| Chronic Disease 3 | 0.01 |
| ......... | ......... |
| Chronic Disease 79 | 0.45 |

John Smith

Provider ID: 13145325

| Member ID | Similarity Measure for Intervention 2 Flu Vaccine | Similarity Measure for Intervention 2 Specific Procedure |
|---|---|---|
| 123456 | 0.0134 | 0.0873 |
| 343451 | 0.0231 | 0.0212 |
| 324216 | 0.0290 | 0.153 |

FIG. 8

CROSS-TEMPORAL ENCODING MACHINE LEARNING MODELS

BACKGROUND

Various embodiments of the present invention address technical challenges related to performing predictive data analysis operations and address the efficiency and reliability shortcomings of existing predictive data analysis solutions.

BRIEF SUMMARY

In general, embodiments of the present invention provide methods, apparatus, systems, computing devices, computing entities, and/or the like for perform predictive data analysis operations. For example, certain embodiments of the present invention utilize systems, methods, and computer program products that perform predictive data analysis operations by using a cross-temporal encoding machine learning model, such as a cross-temporal encoding machine learning model that is generated by using a target intervention classification machine learning model to map outputs of the cross-temporal encoding machine learning model to historical target intervention labels, thus enabling supervised training of the cross-temporal encoding machine learning without the need for ground-truth data corresponding to the output of the cross-temporal encoding machine learning model.

In accordance with one aspect, a method is provided. In one embodiment, the method comprises: identifying an ordered sequence of one or more event codes associated with a predictive entity; determining, using a cross-temporal encoding machine learning model and based at least in part on the ordered sequence, a cross-temporal encoding of the predictive entity based at least in part on the ordered sequence; determining, based at least in part on the cross-temporal encoding of the predictive entity and a target intervention cross-temporal encoding for a target intervention, a cross-temporal similarity measure for the predictive entity; determining, based at least in part on the cross-temporal similarity measure, the intervention relatedness measure; and performing one or more prediction-based actions based at least in part on the intervention relatedness measure.

In accordance with another aspect, a computer program product is provided. The computer program product may comprise at least one computer-readable storage medium having computer-readable program code portions stored therein, the computer-readable program code portions comprising executable portions configured to: identify an ordered sequence of one or more event codes associated with a predictive entity; determine, using a cross-temporal encoding machine learning model and based at least in part on the ordered sequence, a cross-temporal encoding of the predictive entity based at least in part on the ordered sequence; determine, based at least in part on the cross-temporal encoding of the predictive entity and a target intervention cross-temporal encoding for a target intervention, a cross-temporal similarity measure for the predictive entity; determine, based at least in part on the cross-temporal similarity measure, the intervention relatedness measure; and perform one or more prediction-based actions based at least in part on the intervention relatedness measure.

In accordance with yet another aspect, an apparatus comprising at least one processor and at least one memory including computer program code is provided. In one embodiment, the at least one memory and the computer program code may be configured to, with the processor, cause the apparatus to: identify an ordered sequence of one or more event codes associated with a predictive entity; determine, using a cross-temporal encoding machine learning model and based at least in part on the ordered sequence, a cross-temporal encoding of the predictive entity based at least in part on the ordered sequence; determine, based at least in part on the cross-temporal encoding of the predictive entity and a target intervention cross-temporal encoding for a target intervention, a cross-temporal similarity measure for the predictive entity; determine, based at least in part on the cross-temporal similarity measure, the intervention relatedness measure; and perform one or more prediction-based actions based at least in part on the intervention relatedness measure.

BRIEF DESCRIPTION OF THE DRAWINGS

Figure 1:
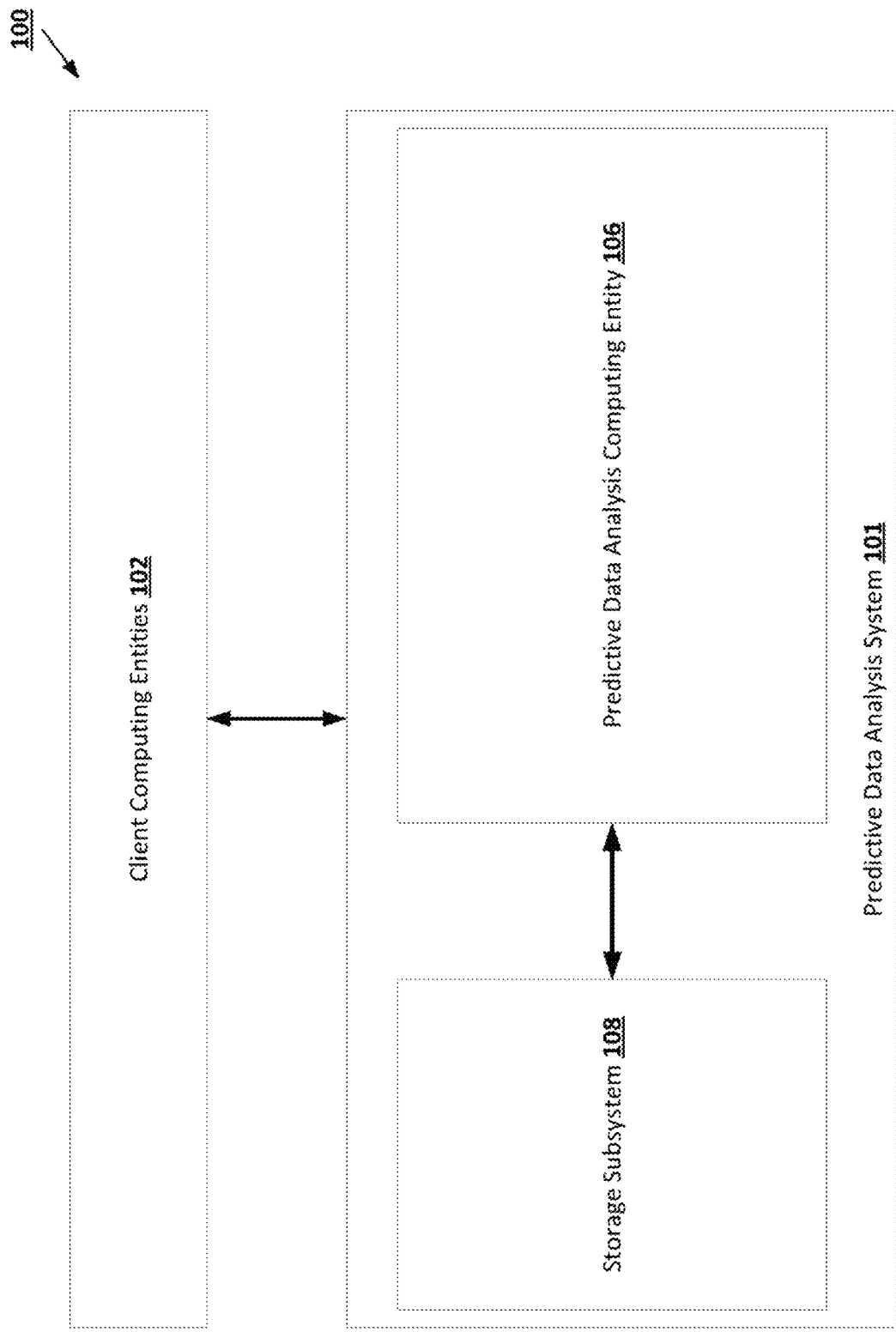

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
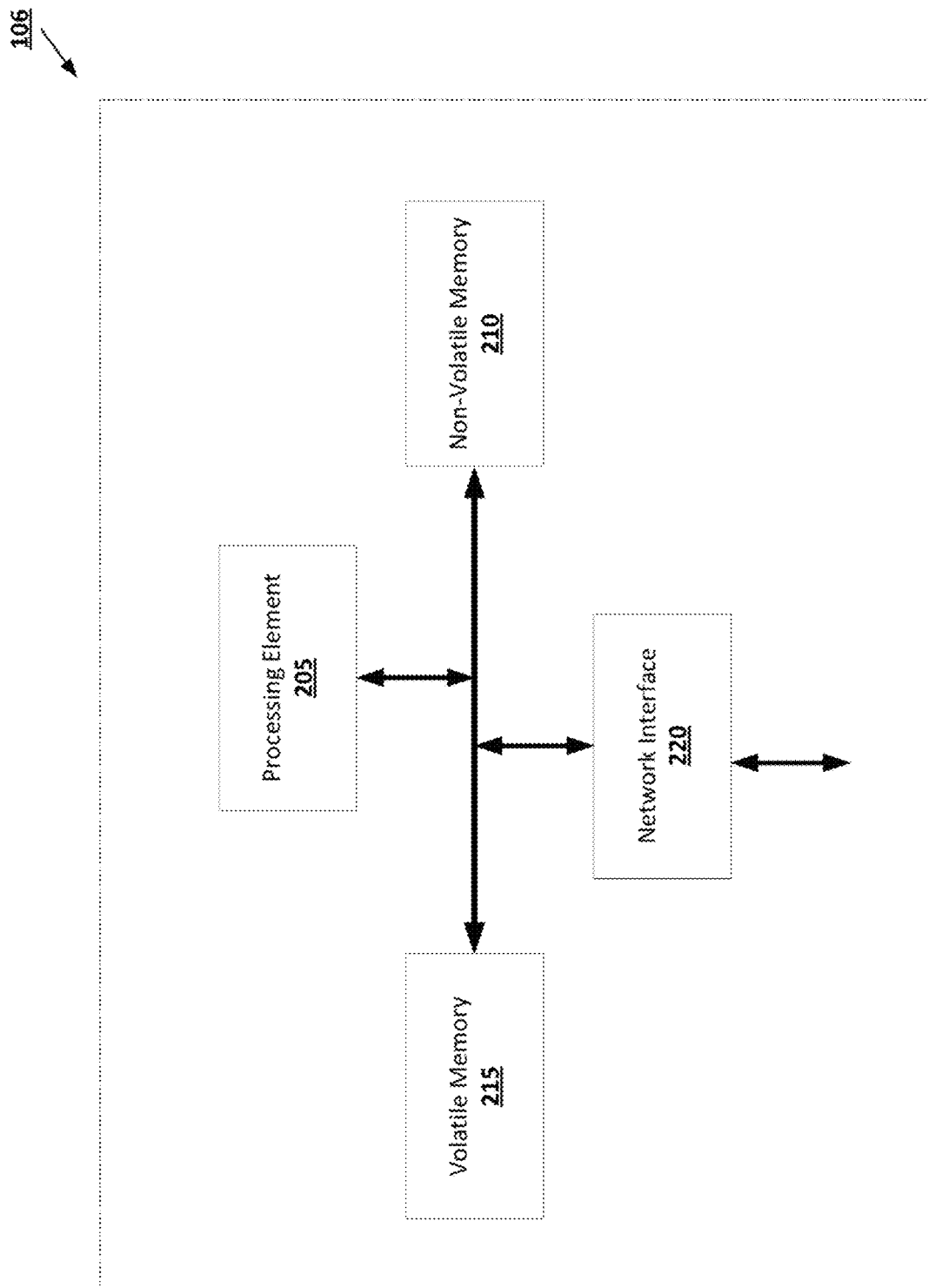

FIG. 2 provides an example predictive data analysis computing entity in accordance with some embodiments discussed herein.

Figure 3:
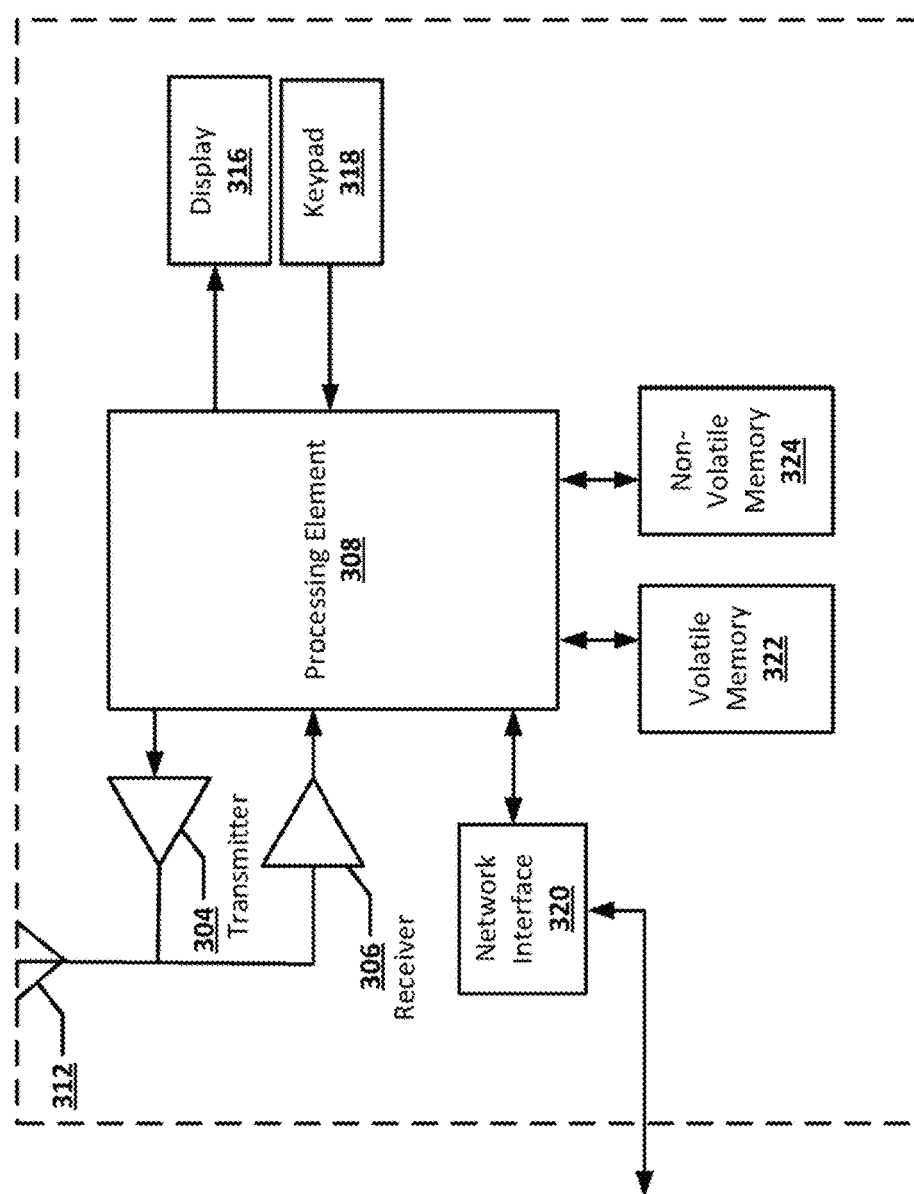

FIG. 3 provides an example client computing entity in accordance with some embodiments discussed herein.

Figure 4:
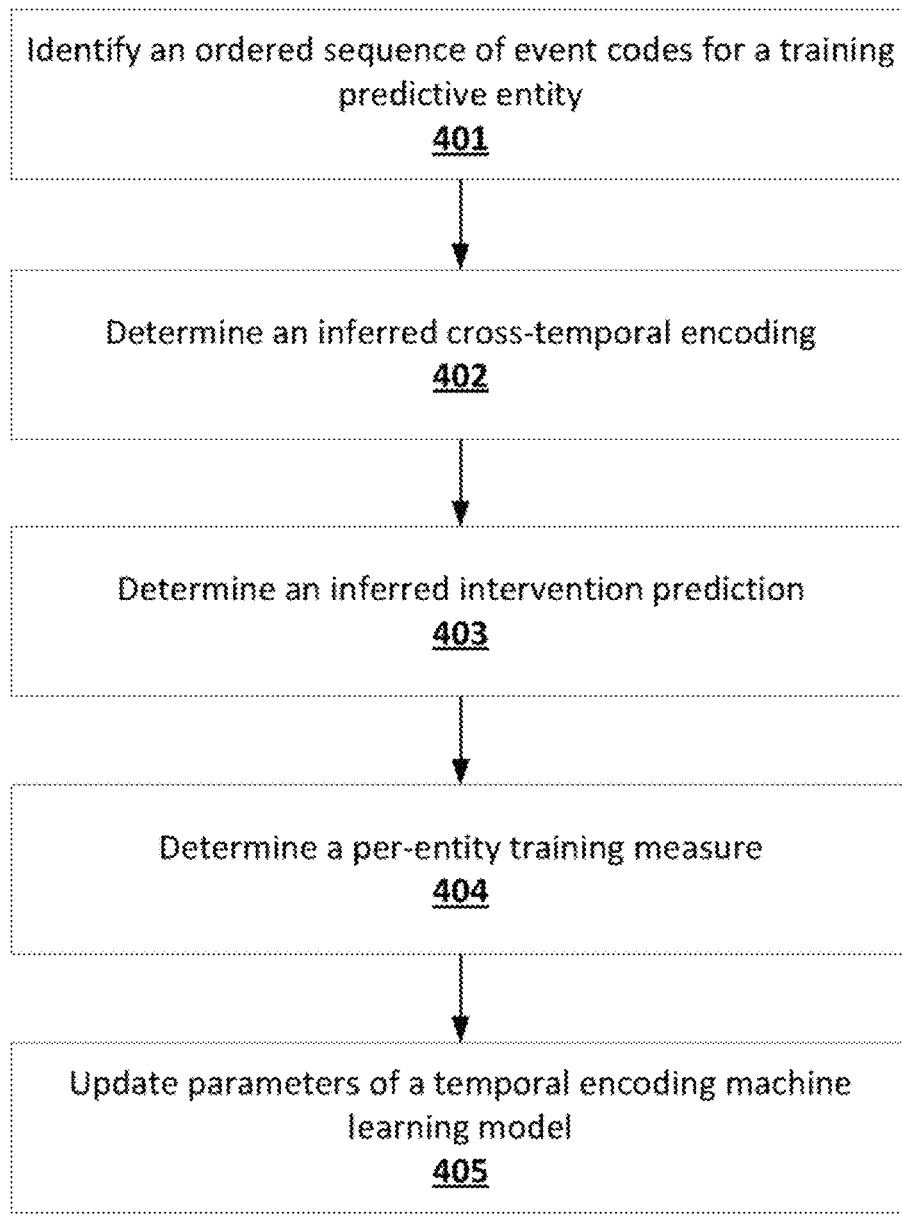

FIG. 4 is a flowchart diagram of an example process for generating a cross-temporal encoding machine learning model in accordance with some embodiments discussed herein.

Figure 5:
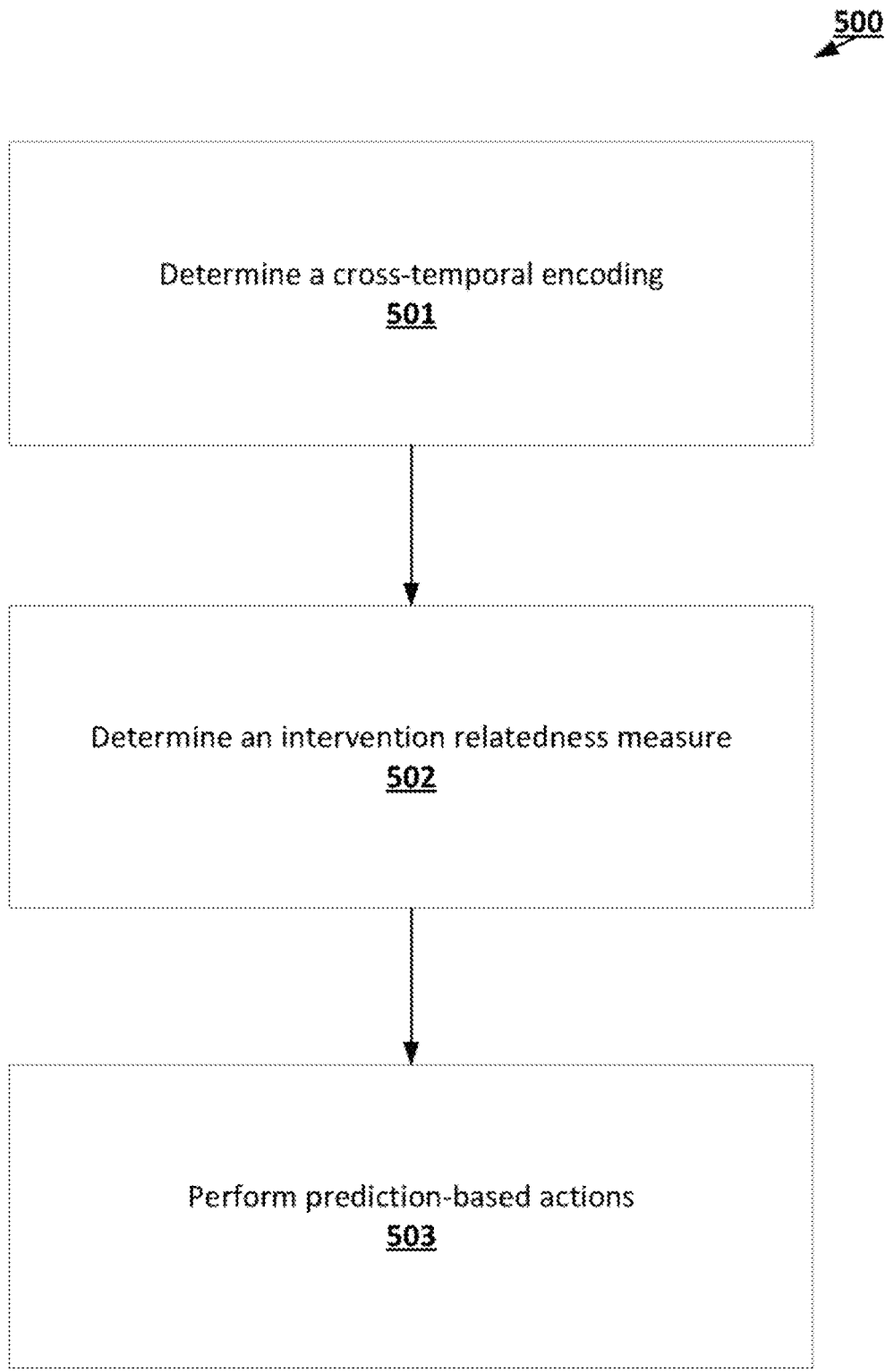

FIG. 5 is a flowchart diagram of an example process for generating an intervention relatedness measure for a predictive entity with respect to a target intervention in accordance with some embodiments discussed herein.

Figure 6:
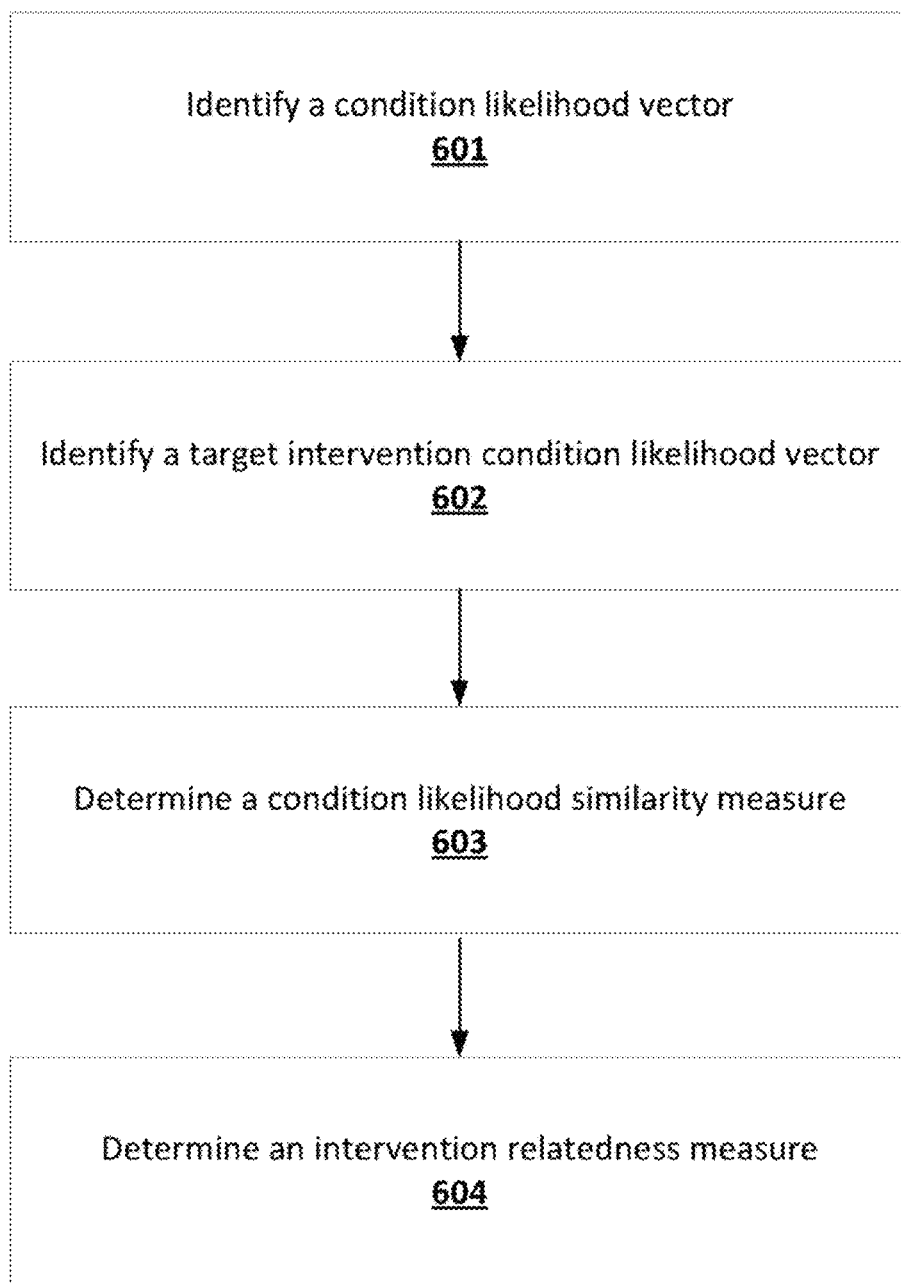

FIG. 6 is a flowchart diagram of an example process for generating an intervention relatedness measure based at least in part on a cross-temporal similarity measure and a condition likelihood similarity measure in accordance with some embodiments discussed herein.

FIG. 7 provides an operational example of generating a condition likelihood vector for a predictive entity in accordance with some embodiments discussed herein.

FIG. 8 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Various embodiments of the present invention address technical challenges related to improving storage efficiency of training and maintaining cross-temporal encoding machine learning models. For example, various embodiments of the present invention disclose using a target intervention classification machine learning model to map outputs of the cross-temporal encoding machine learning model to historical target intervention labels, thus enabling supervised training of the cross-temporal encoding machine learning without the need for ground-truth data corresponding to the output of the cross-temporal encoding machine learning model. By using the noted techniques, cross temporal encoding machine learning models can be trained using ground-truth data of target intervention classification machine learning models which is more readily available as historical data on many predictive data analysis frameworks. Therefore, various embodiments of the present invention reduce the need for storing training data in order to train cross-temporal encoding machine learning models, thus in turn increasing storage efficiency of predictive data analysis systems that are configured to train and maintain such models, and making important technical contributions to the field of predictive data analysis.

Moreover, various embodiments of the present invention improve operational efficiency of predictive data analysis systems that are configured to generate intervention relatedness measures for target interventions. For example, various embodiments of the present invention introduce techniques for generating reliable and efficient intervention relatedness measures for target interventions by using cross-temporal similarity measures for predictive entities and the target interventions. By using the noted techniques, the need for generating repeated queries for intervention relatedness measures for target interventions based at least in part on new input data is reduced, thus reducing operational load on predictive data analysis systems that are configured to generate intervention relatedness measures for target interventions, improving the operational efficiency of the noted predictive data analysis, and making further technical contributions to the field of predictive data analysis.

An exemplary application of various embodiments of the present invention relates to enhancing utilization of healthcare resources by identifying members with respect to whom a specific early intervention to manage healthcare were successful and then applying machine learning techniques to identify similar members for that specific intervention. The noted operations may be performed through analyzing medical claims data, disease prediction scores, and model embeddings to identify similar members based at least in part on medical signatures over time.

In some embodiments, the members for whom a clinical intervention was successful in preventing a hospital admission are identified. An example of this would be a person with emerging risk for a chronic disease. A hospital admission or emergency room (ER) visit may have occurred prior to a person being diagnosed and being put on the correct treatment path. If this person was identified to have emerging risk and put on the correct care path earlier, the admission or ER visit could be potentially be avoided. Another example could relate to recommend influenza vaccination to prevent hospital admission in a high-risk patient who will be more adversely impacted by influenza. Once a successful targeted intervention has been identified, a proposed system can search the healthcare membership for people with an extremely similar healthcare pattern up to a point in time that the intervention is likely most needed.

In some embodiments, members with the most similar health profile to a targeted intervention across the multi-morbidity space are detected. For each member, the system may maintain an existing or emerging risk profile across 79 chronic conditions by utilizing multiple healthcare datasets. Using the risk information of a patient that has experienced targeted intervention, a proposed system can detect most similar members to this patient through the following a minimization search, with additional weights allocated to chronic diseases that are deemed more related to the targeted intervention and its co-morbidity profile. For example, in the case of influenza, a proposed system may allocate additional weight to people with significant respiratory and vascular complications. This may enable the proposed system to identify people with a similar health profile in relation to the specific intervention of interest. In some embodiments, the similarity of a member to a targeted intervention is determined using the operations of the equation $SM_i = |\Sigma_j W_j (Pu_j - Pm_{i,j})|$, where $SM_i$ is the similarity measure of member i to a targeted intervention, j iterates over all chronic conditions, $Pu_j$ is the emerging risk of disease j for the targeted intervention, $Pm_{i,j}$ is the emerging risk of disease j for member i, and $W_j$ is a matrix that includes the weights for disease j.

In some embodiments, a medical signature for the targeted intervention over time is determined. One objective of this operation may be to detect not just the closest matching health profile at the current point in time across the multi-morbidity space but how the closest matching health profile has evolved through time, particularly in relation to a specific chronic disease level that relates to the targeted intervention. To do this, a proposed system can leverage the existing disease prediction architecture by tapping into the hidden states of a corresponding network having multiple hidden steps. Tapping into the sequential hidden states of the network at different points in time and then performing a similarity search in this embedded space allows the proposed system to gather a more comprehensive similarity match measure with respect to the targeted intervention. By using the described techniques, a proposed system can not only make inferences based at least in part on those who are most similar today to a targeted intervention, but also those who were most similar twelve months ago to a targeted intervention of interest.

In some embodiments, the similarity measure calculated from the disease risk scores with the similarity measure calculated from the hidden state vectors are combined into a combined similarity measure. Patients who are most likely in need of a targeted intervention can then be prioritized for specific interventions and can be ranked accordingly by sorting the patients in accordance with the combined similarity measure.

II. Definitions

The term "predictive entity" may refer to a data construct that is configured to describe an entity (e.g., a real world entity such as a patient/member predictive entity and/or a virtual predictive entity) that is associated with an ordered sequence of event codes, where each event code may describe an event/condition that is recorded to have occurred to the entity, and where the ordered sequence may be determined based at least in part on historical data associated with the entity. For example, the predictive entity may describe a patient/member predictive entity, each event code may describe a diagnosis code and/or a procedure code (e.g., an International Classification of Disease (ICD) code, a Current Procedural Terminology (CPT) code, and/or the like) associated with the patient/member predictive entity, and the ordered sequence of event codes may be determined based at least in part on clinical history data associated with the patient/member predictive entity (e.g., such that if ICD code $I_1$ is recorded as being associated with a medical visit $V_1$ for the patient/member predictive entity, and ICD code $I_2$ is recorded as being associated with a medical visit $V_2$ for the patient/member predictive entity, and if $V_1$ occurs before $V_2$, then $I_1$ occurs prior to $I_2$ in the ordered sequence, with the relative ordering of ICD/CPT codes that are recorded in the same medical visit in some embodiments being randomly selected). In some embodiments, when a predictive entity is associated with a historical target intervention label that describes whether the predictive entity is recorded to have been subject to a target intervention (e.g., whether a patient/member predictive entity is recorded to have been subject to a particular clinical intervention such as a depression-related hospitalization), then the predictive entity may be used to update trainable parameters of a cross-temporal encoding machine learning model, and the predictive entity may thus be referred to herein as a training predictive entity. In some embodiments, when a predictive entity is associated with a historical target intervention label that describes that the predictive entity is recorded to have been subject to a target intervention (e.g., that a patient/member predictive entity is recorded to have been subject to a particular clinical intervention such as a depression-related hospitalization), the ordered sequence of event codes that are associated with the predictive entity may be used to generate a target intervention cross-temporal encoding for the target intervention, and thus the predictive entity may be referred to herein as a target intervention predictive entity.

The term "historical target intervention label" may refer to a data construct that is configured to describe whether a corresponding predictive entity is recorded to have been subject to a target intervention. For example, the historical target intervention label for a patient/member predictive entity may describe whether the patient/member predictive entity is recorded to have been subject to a clinical intervention, such as to a depression-related hospitalization. In some embodiments, when one or more predictive entities are recorded to have been subject to a target intervention, the condition likelihood vector and/or the ordered sequence of clinical events for at least one of the noted predictive entities may be used to determine a condition likelihood vector and/or a cross-temporal encoding for the target intervention respectively. For example, when a particular patient/member is recorded to have been subject to depression-related hospitalization within a defined timeframe in the past, then the ordered sequence of ICD/CPT codes for the particular patient/member may be processed by a trained cross-temporal encoding machine learning model to generate a target intervention cross-temporal encoding for depression-related hospitalization. As another example, when a particular patient/member is recorded to have been subject to depression-related hospitalization within a defined timeframe in the past, then a condition likelihood vector for the patient/member that describes n condition likelihood scores for the patient/member with respect to n defined predictive input conditions (e.g., n defined chronic conditions) may be used to generate a target intervention condition likelihood vector for depression-related hospitalization.

The term "cross-temporal encoding machine learning model" may refer to a data construct that is configured to describe parameters, hyper-parameters, and/or defined operations of a machine learning model that is configured to process an ordered sequence of event codes for a predictive entity to generate output data that may be used to generate a cross-temporal encoding of the predictive entity. In some embodiments, inputs to the cross-temporal encoding machine learning model describe m event codes that are ordered in a defined manner. For example, an input to the cross-temporal encoding machine learning model may include a vector that describes the m event codes and/or m vectors each describing a representation (e.g., a one-hot-coded representation) of a corresponding event code. In some embodiments, if an input predictive entity is associated with less than m event codes, then the event codes of the input predictive entity are padded with default values (e.g., zero padded) so that the ordered sequence for the input predictive entity includes m event codes. In some embodiments, if an input predictive entity is associated with more than m event codes, then the event codes of the input predictive entity are truncated (e.g., by removing the oldest event codes) so that the ordered sequence for the input predictive entity includes m event codes. In some embodiments, outputs of the cross-temporal encoding machine learning model include a vector that describes a cross-temporal encoding of an input predictive entity and/or a vector that describes a cross-temporal encoding update of an input predictive entity.

The term "cross-temporal encoding" may refer to a data construct that is configured to describe a representation of a predictive entity that is generated based at least in part on output data generated via processing input data associated with the predictive entity using a cross-temporal encoding machine learning model. For example, in some embodiments, the cross-temporal encoding machine learning model may be configured to directly generate the cross-temporal encoding of an input predictive entity. As another example, in some embodiments, the cross-temporal encoding machine learning model may be configured to generate a cross-temporal encoding update for an input predictive entity, where the cross-temporal encoding update may describe a vector that should be used along with a prior cross-temporal encoding for the predictive entity in order to generate the cross-temporal encoding for the predictive entity. For example, in some embodiments, when a cross-temporal encoding is determined using a first ordered sequence of event codes for a corresponding predictive entity, the cross-temporal encoding is recorded/saved as a prior cross-temporal encoding for the corresponding predictive entity. In some of the noted embodiments, if a new ordered sequence of event codes is received for the corresponding predictive entity, then the new ordered sequence are processed using the cross-temporal encoding machine learning model to generate a cross-temporal encoding update that is then combined (e.g., added to, averaged with, and/or the like) with the prior cross-temporal encoding in order to generate the new cross-temporal encoding for the corresponding predictive entity.

The term "target intervention classification machine learning model" may refer to a data construct that is configured to describe parameters, hyper-parameters, and/or defined operations of a machine learning model that is configured to process input data that is determined based at least in part on a cross-temporal encoding of an input predictive entity to generate a target intervention prediction that describes the likelihood that the input predictive entity will be or has been subject to a target intervention. For example, the target intervention classification machine learning model may be configured to process input data that is determined based at least in part on a cross-temporal encoding of a patient/member predictive entity (e.g., input data that is determined based at least in part on a multi-morbidity representation of clinical history data of the patient/member predictive entity) in order to determine a target intervention prediction that describes a computed likelihood that the patient/member predictive entity has been or will be subject to a particular clinical intervention, such as to depression-related hospitalization. In some embodiments, input data for the target intervention classification machine learning model is a vector that describes a cross-temporal encoding of an input predictive entity (e.g., during training of the target intervention classification machine learning model along with the cross-temporal encoding machine learning model, the inferred cross-temporal encoding of a training predictive entity). In some embodiments, input data for the target intervention classification machine learning model is a vector that is determined based at least in part on both the cross-temporal encoding of an input predictive entity and a condition likelihood vector for the input predictive entity. In some embodiments, inputs of the target intervention classification machine learning model include a vector that describes input data determined based at least in part on a cross-temporal encoding of an input predictive entity, a vector that describes input data determined based at least in part on a cross-temporal encoding of an input predictive entity and a condition likelihood vector for the input predictive entity, two vectors describing a cross-temporal encoding of an input predictive entity and a condition likelihood vector for the input predictive entity respectively, and/or the like. In some embodiments, outputs of the target intervention classification machine learning model include a vector and/or an atomic value that describes the inferred/computed likelihood that an input predictive entity is associated with a target intervention (e.g., has been subject or will be subject to a target intervention such as a particular target intervention that is associated with a particular clinical intervention).

The term "per-entity training measure" may refer to a data construct that is configured to describe a measure of deviation the inferred target intervention prediction for a training predictive entity and the historical target intervention label for the training predictive entity. In some embodiments, the per-entity training measure describes a measure of error/deviation between the inferred target intervention prediction for the training predictive entity and the historical target intervention label for the training predictive entity. For example, if the training predictive entity is associated with a historical target intervention label of 1.0 describing that the training predictive entity has been subject to the target intervention, and if the inferred target intervention prediction for the training predictive entity as generated by the target intervention classification machine learning model is 0.40, the per-entity training measure for the target predictive entity may be determined based at least in part on the output of the computation $|1.0-0.40|=0.60$. As another example, if the training predictive entity is associated with a historical target intervention label of 0.0 describing that the training predictive entity has not been subject to the target intervention, and if the inferred target intervention prediction for the training predictive entity as generated by the target intervention classification machine learning model is 0.30, the per-entity training measure for the target predictive entity may be determined based at least in part on the output of the computation $|0.0-0.30|=0.70$.

The term "cross-temporal encoding update" may refer to a data construct that is configured to describe a vector that is configured to be combined with a prior cross-temporal encoding update for a corresponding predictive entity in order to generate a new cross-temporal encoding update for the predictive entity. As described above, in some other embodiments, the trained cross-temporal encoding machine learning model is configured to process input data generated based at least in part on the ordered sequence of event codes for the predictive entity to generate output data that comprises a cross-temporal encoding update for the predictive entity, where the cross-temporal encoding update may be combined with a prior cross-temporal encoding for the predictive entity to generate the cross-temporal encoding for the predictive entity. In some embodiments, during an initial processing of input data for a particular predictive entity (e.g., clinical history data of a particular patient/member), the prior cross-temporal encoding for the particular predictive entity is a default cross-temporal encoding (e.g., a default cross-temporal encoding having all zero values). In some embodiments, during a post-initial processing of input data for a particular predictive entity (e.g., clinical history data of a particular patient/member), the prior cross-temporal encoding for the particular predictive entity is a previously-generated cross-temporal encoding for the particular predictive entity.

The term "cross-temporal similarity measure" may refer to a data construct that is configured to describe a similarity measure for a similarity/distance measure for the cross-temporal encoding of a corresponding predictive entity and a target intervention cross-temporal entity for the target intervention. In some embodiments, the target intervention cross-temporal entity is generated by the trained cross-temporal encoding machine learning model that is also used to generate the target intervention classification machine learning model.

The term "target intervention cross-temporal encoding" may refer to a data construct that is configured to describe cross-temporal encodings for at least one predictive entity that is associated with the target intervention. For example, when a target intervention describes a clinical intervention, target intervention cross-temporal encoding describes cross-temporal encodings for at least one patient/member predictive entity that is recorded to have been subject to the noted clinical intervention. In some embodiments, when a target intervention is associated with n predictive entities, then: (i) for each predictive entity, the ordered sequence of event codes for the predictive entity is processed by a trained cross-temporal encoding machine learning model to generate a per-entity cross-temporal encoding, and (ii) the per-entity event cross-temporal encodings for the n predictive entities are combined (e.g., summed up, averaged, and/or the like) to generate the target intervention cross-temporal encoding for the target intervention. In some embodiments, when a target intervention is associated with n predictive entities, then: (i) a selected predictive entity of the n predictive entities is selected (e.g., randomly selected, selected based at least in part on one or more predictive entity selection rules, and/or the like), (ii) the ordered sequence of event codes for the selected predictive entity is processed by a trained cross-temporal encoding machine learning model to generate a cross-temporal encoding that is adopted as the target intervention cross-temporal encoding for the target intervention.

The term "intervention relatedness measure" may refer to a data construct that is configured to describe a recommendation score for a predictive entity with respect to a target intervention. In some embodiments, an intervention relatedness measure is determined based at least in part on the cross-temporal similarity measure for the corresponding predictive entity and a condition likelihood similarity measure for the predictive entity. In some embodiments, a predictive data analysis computing entity determines the intervention relatedness measure for the predictive entity based at least in part on a combination (e.g., summation, averaging, and/or the like) of the condition likelihood similarity measure for the predictive entity and the cross-temporal similarity measure for the predictive entity. In some embodiments, a predictive data analysis computing entity processes the condition likelihood similarity measure for the predictive entity and the cross-temporal similarity measure for the predictive entity using a similarity determination machine learning model (e.g., a similarity determination machine learning model comprising one or more fully connected neural network layers) to generate the intervention relatedness measure for the predictive entity.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is generating a clinical intervention recommendation for a patient/member.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Provided below are exemplary techniques for generating an dynamically parameterized machine learning framework and for using a trained dynamically parameterized machine learning framework to perform one or more predictive inferences. However, while various embodiments of the present invention describe the model generation operations described herein and the predictive inference operations described herein as being performed by the same single computing entity, a person of ordinary skill in the relevant technology will recognize that each of the noted sets of operations described herein can be performed by one or more computing entities that may be the same as or different from the one or more computing entities used to perform each of the other sets of operations described herein.

As described below, various embodiments of the present invention address technical challenges related to improving storage efficiency of training and maintaining cross-temporal encoding machine learning models. For example, various embodiments of the present invention disclose using a target intervention classification machine learning model to map outputs of the cross-temporal encoding machine learning model to historical target intervention labels, thus enabling supervised training of the cross-temporal encoding machine learning without the need for ground-truth data corresponding to the output of the cross-temporal encoding machine learning model. By using the noted techniques, cross temporal encoding machine learning models can be trained using ground-truth data of target intervention classification machine learning models which is more readily available as historical data on many predictive data analysis frameworks. Therefore, various embodiments of the present invention reduce the need for storing training data in order to train cross-temporal encoding machine learning models, thus in turn increasing storage efficiency of predictive data analysis systems that are configured to train and maintain such models, and making important technical contributions to the field of predictive data analysis.

As further described below, various embodiments of the present invention improve operational efficiency of predictive data analysis systems that are configured to generate intervention relatedness measures for target interventions. For example, various embodiments of the present invention introduce techniques for generating reliable and efficient intervention relatedness measures for target interventions by using cross-temporal similarity measures for predictive entities and the target interventions. By using the noted techniques, the need for generating repeated queries for intervention relatedness measures for target interventions based at least in part on new input data is reduced, thus reducing operational load on predictive data analysis systems that are configured to generate intervention relatedness measures for target interventions, improving the operational efficiency of the noted predictive data analysis, and making further technical contributions to the field of predictive data analysis.

Model Generation Operations

FIG. 4 is a flowchart diagram of an example process 400 for generating a cross-temporal encoding machine learning model. Via the various steps/operations of the process 400, the predictive data analysis computing entity 106 can use a target intervention classification machine learning model to map outputs of the cross-temporal encoding machine learning model to historical target intervention labels, thus enabling supervised training of the cross-temporal encoding machine learning without the need for ground-truth data corresponding to the output of the cross-temporal encoding machine learning model.

The process 400 begins at step/operation 401 when the predictive data analysis computing entity 106 identifies (e.g., receives, determines, and/or the like) a training predictive entity ordered sequence of training predictive entity event codes associated with a training predictive entity. While various embodiments of the present invention describe generating the cross-temporal encoding machine learning model using a single training predictive entity, a person of ordinary skill in the relevant technology will recognize that the cross-temporal encoding machine learning model can be trained using any number of training predictive entities. In addition, a person of ordinary skill in the relevant technology will recognize that, when the cross-temporal encoding machine learning model is generated using more than one training predictive entities, generating the cross-temporal encoding machine learning model may in some embodiments be performed by updating trainable parameters of the cross-temporal encoding machine learning model using at least one of model training techniques that utilize batch gradient descent and model training techniques that utilize stochastic gradient descent techniques.

In some embodiments, a predictive entity is an entity (e.g., a real world entity such as a patient/member predictive entity and/or a virtual predictive entity) that is associated with an ordered sequence of event codes, where each event code may describe an event/condition that is recorded to have occurred to the entity, and where the ordered sequence may be determined based at least in part on historical data associated with the entity. For example, the predictive entity may describe a patient/member predictive entity, each event code may describe a diagnosis code and/or a procedure code (e.g., an International Classification of Disease (ICD) code, a Current Procedural Terminology (CPT) code, and/or the like) associated with the patient/member predictive entity, and the ordered sequence of event codes may be determined based at least in part on clinical history data associated with the patient/member predictive entity (e.g., such that if ICD code $I_1$ is recorded as being associated with a medical visit $V_1$ for the patient/member predictive entity, and ICD code $I_2$ is recorded as being associated with a medical visit $V_2$ for the patient/member predictive entity, and if $V_1$ occurs before $V_2$, then $I_1$ occurs prior to $I_2$ in the ordered sequence, with the relative ordering of ICD/CPT codes that are recorded in the same medical visit in some embodiments being randomly selected).

In some embodiments, when a predictive entity is associated with a historical target intervention label that describes whether the predictive entity is recorded to have been subject to a target intervention (e.g., whether a patient/member predictive entity is recorded to have been subject to a particular clinical intervention such as a depression-related hospitalization), then the predictive entity may be used to update trainable parameters of a cross-temporal encoding machine learning model, and the predictive entity may thus be referred to herein as a training predictive entity. In some embodiments, when a predictive entity is associated with a historical target intervention label that describes that the predictive entity is recorded to have been subject to a target intervention (e.g., that a patient/member predictive entity is recorded to have been subject to a particular clinical intervention such as a depression-related hospitalization), the ordered sequence of event codes that are associated with the predictive entity may be used to generate a target intervention cross-temporal encoding for the target intervention, and thus the predictive entity may be referred to herein as a target intervention predictive entity.

A historical target intervention label may describe whether a corresponding predictive entity is recorded to have been subject to a target intervention. For example, the historical target intervention label for a patient/member predictive entity may describe whether the patient/member predictive entity is recorded to have been subject to a clinical intervention, such as to a depression-related hospitalization. In some embodiments, when one or more predictive entities are recorded to have been subject to a target intervention, the condition likelihood vector and/or the ordered sequence of clinical events for at least one of the noted predictive entities may be used to determine a condition likelihood vector and/or a cross-temporal encoding for the target intervention respectively. For example, when a particular patient/member is recorded to have been subject to depression-related hospitalization within a defined timeframe in the past, then the ordered sequence of ICD/CPT codes for the particular patient/member may be processed by a trained cross-temporal encoding machine learning model to generate a target intervention cross-temporal encoding for depression-related hospitalization. As another example, when a particular patient/member is recorded to have been subject to depression-related hospitalization within a defined timeframe in the past, then a condition likelihood vector for the patient/member that describes n condition likelihood scores for the patient/member with respect to n defined predictive input conditions (e.g., n defined chronic conditions) may be used to generate a target intervention condition likelihood vector for depression-related hospitalization.

At step/operation 402, the predictive data analysis computing entity 106 processes the ordered sequence associated with the training predictive entity using the cross-temporal encoding machine learning model to generate an inferred cross-temporal encoding for the training predictive entity. In some embodiments, if the cross-temporal encoding machine learning model is being trained from scratch, then the cross-temporal encoding machine learning model that is used at step/operation 402 is one defined by default values for trainable parameters of the cross-temporal encoding machine learning model. In some embodiments, if the cross-temporal encoding machine learning model is being retrained, then the cross-temporal encoding machine learning model that is used at step/operation 402 is one defined by updated values for trainable parameters of the cross-temporal encoding machine learning model, where the updated values are determined during a prior training epoch for training the cross-temporal encoding machine learning model.

The cross-temporal encoding machine learning model may be configured to process an ordered sequence of event codes for a predictive entity to generate output data that may be used to generate a cross-temporal encoding of the predictive entity. For example, in some embodiments, the cross-temporal encoding machine learning model may be configured to directly generate the cross-temporal encoding of an input predictive entity. As another example, in some embodiments, the cross-temporal encoding machine learning model may be configured to generate a cross-temporal encoding update for an input predictive entity, where the cross-temporal encoding update may describe a vector that should be used along with a prior cross-temporal encoding for the predictive entity in order to generate the cross-temporal encoding for the predictive entity. For example, in some embodiments, when a cross-temporal encoding is determined using a first ordered sequence of event codes for a corresponding predictive entity, the cross-temporal encoding is recorded/saved as a prior cross-temporal encoding for the corresponding predictive entity. In some of the noted embodiments, if a new ordered sequence of event codes is received for the corresponding predictive entity, then the new ordered sequence are processed using the cross-temporal encoding machine learning model to generate a cross-temporal encoding update that is then combined (e.g., added to, averaged with, and/or the like) with the prior cross-temporal encoding in order to generate the new cross-temporal encoding for the corresponding predictive entity.

In some embodiments, inputs to the cross-temporal encoding machine learning model describe m event codes that are ordered in a defined manner. For example, an input to the cross-temporal encoding machine learning model may include a vector that describes the m event codes and/or m vectors each describing a representation (e.g., a one-hot-coded representation) of a corresponding event code. In some embodiments, if an input predictive entity is associated with less than m event codes, then the event codes of the input predictive entity are padded with default values (e.g., zero padded) so that the ordered sequence for the input predictive entity includes m event codes. In some embodiments, if an input predictive entity is associated with more than m event codes, then the event codes of the input predictive entity are truncated (e.g., by removing the oldest event codes) so that the ordered sequence for the input predictive entity includes m event codes. In some embodiments, outputs of the cross-temporal encoding machine learning model include a vector that describes a cross-temporal encoding of an input predictive entity and/or a vector that describes a cross-temporal encoding update of an input predictive entity.

At step/operation 403, the predictive data analysis computing entity 106 processes the inferred cross-temporal encoding of the training predictive entity using a target intervention classification machine learning model to generate an inferred target intervention prediction for the training predictive entity. In some embodiments, the target intervention classification machine learning model is configured to process input data that is determined based at least in part on a cross-temporal encoding of an input predictive entity to generate a target intervention prediction that describes the likelihood that the input predictive entity will be or has been subject to a target intervention. For example, the target intervention classification machine learning model may be configured to process input data that is determined based at least in part on a cross-temporal encoding of a patient/member predictive entity (e.g., input data that is determined based at least in part on a multi-morbidity representation of clinical history data of the patient/member predictive entity) in order to determine a target intervention prediction that describes a computed likelihood that the patient/member predictive entity has been or will be subject to a particular clinical intervention, such as to depression-related hospitalization.

In some embodiments, input data for the target intervention classification machine learning model is a vector that describes a cross-temporal encoding of an input predictive entity (e.g., during training of the target intervention classification machine learning model along with the cross-temporal encoding machine learning model, the inferred cross-temporal encoding of a training predictive entity). In some embodiments, input data for the target intervention classification machine learning model is a vector that is determined based at least in part on both the cross-temporal encoding of an input predictive entity and a condition likelihood vector for the input predictive entity. In some embodiments, inputs of the target intervention classification machine learning model include a vector that describes input data determined based at least in part on a cross-temporal encoding of an input predictive entity, a vector that describes input data determined based at least in part on a cross-temporal encoding of an input predictive entity and a condition likelihood vector for the input predictive entity, two vectors describing a cross-temporal encoding of an input predictive entity and a condition likelihood vector for the input predictive entity respectively, and/or the like. In some embodiments, outputs of the target intervention classification machine learning model include a vector and/or an atomic value that describes the inferred/computed likelihood that an input predictive entity is associated with a target intervention (e.g., has been subject or will be subject to a target intervention such as a particular target intervention that is associated with a particular clinical intervention).

At step/operation 404, the predictive data analysis computing entity 106 determines a per-entity training measure for the training predictive entity based at least in part on the inferred target intervention prediction for the training predictive entity and the historical target intervention label for the training predictive entity. In some embodiments, the per-entity training measure describes a measure of error/deviation between the inferred target intervention prediction for the training predictive entity and the historical target intervention label for the training predictive entity. For example, if the training predictive entity is associated with a historical target intervention label of 1.0 describing that the training predictive entity has been subject to the target intervention, and if the inferred target intervention prediction for the training predictive entity as generated by the target intervention classification machine learning model is 0.40, the per-entity training measure for the target predictive entity may be determined based at least in part on the output of the computation |1.0−0.40|=0.60. As another example, if the training predictive entity is associated with a historical target intervention label of 0.0 describing that the training predictive entity has not been subject to the target intervention, and if the inferred target intervention prediction for the training predictive entity as generated by the target intervention classification machine learning model is 0.30, the per-entity training measure for the target predictive entity may be determined based at least in part on the output of the computation |0.0−0.30|=0.70.

At step/operation 405, the predictive data analysis computing entity 106 updates one or more trainable parameters of the cross-temporal encoding machine learning model based at least in part on the per-entity training measure. In some embodiments, the predictive data analysis computing entity 106 updates one or more trainable parameters of the cross-temporal encoding machine learning model and one or more trainable parameters of the target intervention classification machine learning model based at least in part on the per-entity training measure. In some embodiments, the predictive data analysis computing entity 106 updates one or more trainable parameters of the cross-temporal encoding machine learning model and/or and one or more trainable parameters of the target intervention classification machine learning model by optimizing an overall training measure (e.g., a loss function) that is determined based at least in part on each per-entity training measure for each training predictive entity of n training predictive entities.

By using the model generation techniques described above, various embodiments of the present invention address technical challenges related to improving storage efficiency of training and maintaining cross-temporal encoding machine learning models. For example, various embodiments of the present invention disclose using a target intervention classification machine learning model to map outputs of the cross-temporal encoding machine learning model to historical target intervention labels, thus enabling supervised training of the cross-temporal encoding machine learning without the need for ground-truth data corresponding to the output of the cross-temporal encoding machine learning model. By using the noted techniques, cross temporal encoding machine learning models can be trained using ground-truth data of target intervention classification machine learning models which is more readily available as historical data on many predictive data analysis frameworks. Therefore, various embodiments of the present invention reduce the need for storing training data in order to train cross-temporal encoding machine learning models, thus in turn increasing storage efficiency of predictive data analysis systems that are configured to train and maintain such models, and making important technical contributions to the field of predictive data analysis.

Predictive Inference Operations

Once trained, the cross-temporal encoding machine learning model can be used to generate cross-temporal encoding of predictive entities that can then be used to generate intervention relatedness measures for particular predictive entities with respect to a target intervention (e.g., an intervention relatedness measure that describes a recommendation score for a clinical intervention in relation to a particular patient/member predictive entity). FIG. 5 is a flowchart diagram of an example process 500 for determining an intervention relatedness measure for a predictive entity with respect to a target intervention.

The process 500 begins at step/operation 501 when the predictive data analysis computing entity 106 processes an ordered sequence of event codes for the predictive entity using a trained cross-temporal encoding machine learning model (e.g., a trained cross-temporal encoding machine learning model that is generated in accordance with the process 400 of FIG. 4) to generate a cross-temporal encoding for the predictive entity. As described above, in some embodiments, the trained cross-temporal encoding machine learning model is configured to process input data generated based at least in part on the ordered sequence of event codes for the predictive entity to generate output data that comprises the cross-temporal encoding for the predictive entity. As further described above, in some other embodiments, the trained cross-temporal encoding machine learning model is configured to process input data generated based at least in part on the ordered sequence of event codes for the predictive entity to generate output data that comprises a cross-temporal encoding update for the predictive entity, where the cross-temporal encoding update may be combined with a prior cross-temporal encoding for the predictive entity to generate the cross-temporal encoding for the predictive entity.

In some embodiments, during an initial processing of input data for a particular predictive entity (e.g., clinical history data of a particular patient/member), the prior cross-temporal encoding for the particular predictive entity is a default cross-temporal encoding (e.g., a default cross-temporal encoding having all zero values). In some embodiments, during a post-initial processing of input data for a particular predictive entity (e.g., clinical history data of a particular patient/member), the prior cross-temporal encoding for the particular predictive entity is a previously-generated cross-temporal encoding for the particular predictive entity.

At step/operation 502, the predictive data analysis computing entity 106 determines a cross-temporal similarity measure for the predictive entity based at least in part on the cross-temporal encoding for the predictive entity. In some embodiments, the cross-temporal similarity measure is a similarity/distance measure for the cross-temporal encoding of the predictive entity and a target intervention cross-temporal entity for the target intervention. In some embodiments, the target intervention cross-temporal entity is generated by the trained cross-temporal encoding machine learning model that is also used to generate the target intervention classification machine learning model.

In some embodiments, a target intervention cross-temporal encoding describes cross-temporal encodings for at least one predictive entity that is associated with the target intervention. For example, when a target intervention describes a clinical intervention, target intervention cross-temporal encoding describes cross-temporal encodings for at least one patient/member predictive entity that is recorded to have been subject to the noted clinical intervention. In some embodiments, when a target intervention is associated with n predictive entities, then: (i) for each predictive entity, the ordered sequence of event codes for the predictive entity is processed by a trained cross-temporal encoding machine learning model to generate a per-entity cross-temporal encoding, and (ii) the per-entity cross-temporal encodings for the n predictive entities are combined (e.g., summed up, averaged, and/or the like) to generate the target intervention cross-temporal encoding for the target intervention. In some embodiments, when a target intervention is associated with n predictive entities, then: (i) a selected predictive entity of the n predictive entities is selected (e.g., randomly selected, selected based at least in part on one or more predictive entity selection rules, and/or the like), (ii) the ordered sequence of event codes for the selected predictive entity is processed by a trained cross-temporal encoding machine learning model to generate a cross-temporal encoding that is adopted as the target intervention cross-temporal encoding for the target intervention.

In some embodiments, when a target intervention is associated with n predictive entities, then: (i) for each predictive entity, the ordered sequence of event codes for the predictive entity is processed by a trained cross-temporal encoding machine learning model to generate a per-entity cross-temporal encoding for the predictive entity, (ii) for each predictive entity, a measure of similarity/distance between the per-entity cross-temporal encoding for the predictive entity and the cross-temporal encoding for another predictive entity is determined to generate n cross-temporal similarity/distance measures for the target intervention and the other predictive entity, and (iv) the intervention relatedness measure for the target intervention and the other predictive entity is determined by combining (e.g., summing up, averaging, and/or the like) the cross-temporal similarity/distance measures. In some embodiments, when a target intervention is associated with n predictive entities, then: (i) for each predictive entity, the ordered sequence of event codes for the predictive entity is processed by a trained cross-temporal encoding machine learning model to generate a per-entity cross-temporal encoding for the predictive entity, (ii) for each predictive entity, a measure of similarity/distance between the per-entity cross-temporal encoding for the predictive entity and the cross-temporal encoding for another predictive entity is determined to generate n cross-temporal similarity/distance measures for the target intervention and the other predictive entity, and (iv) the intervention relatedness measure for the target intervention and the other predictive entity is determined based at least in part on the largest of n cross-temporal similarity measures and/or based at least in part on the smallest of the n cross-temporal distance measures.

At step/operation 502, the predictive data analysis computing entity 106 determines an intervention relatedness measure for the predictive entity based at least in part on the cross-temporal similarity measure for the predictive entity. In some embodiments, the intervention relatedness measure is determined based at least in part on the cross-temporal similarity measure for the predictive entity. In some embodiments, the intervention relatedness measure is determined based at least in part on the cross-temporal similarity measure for the predictive entity and a condition likelihood similarity measure for the predictive entity, as further described in greater detail below with reference to FIG. 6, which is a flowchart diagram of an example process for determining an intervention relatedness measure for a predictive entity with respect to a target intervention.

The process that is depicted in FIG. 6 begins at step/operation 601 when the predictive data analysis computing entity 106 identifies (e.g., determines, retrieves, and/or the like) a condition likelihood vector for the predictive entity. The condition likelihood vector for the predictive entity may describe n condition likelihood scores for the predictive entity with respect to n defined predictive input conditions (e.g., n condition risk scores for the predictive entity with respect to n chronic conditions). An operational example of a condition likelihood vector is a vector that describes the value sequence 701 of FIG. 7. As depicted in FIG. 7, the resulting condition likelihood vector is a 79-dimensional vector associated with 79 condition likelihood scores for 70 defined predictive input conditions.

At step/operation 602, the predictive data analysis computing entity 106 identifies a target intervention condition likelihood vector for the target intervention. In some embodiments, the target intervention condition likelihood vector describes at least one condition likelihood vector for at least one predictive entity that is associated with the target intervention. For example, in some embodiments, the target intervention condition likelihood vector describes n target intervention condition likelihood scores for a target intervention predictive entity that is associated with the target intervention (e.g., a patient/member predictive entity that is recorded to have been subject to a clinical intervention that is associated with the target intervention) with respect to the n defined predictive input conditions.

In some embodiments, when a target intervention is associated with m predictive entities, then the clinical condition vectors for the m predictive entities are combined (e.g., summed up, averaged, and/or the like) to generate the target intervention condition likelihood vector for the target intervention. In some embodiments, when a target intervention is associated with m predictive entities, then the clinical condition vectors for a selected predictive entity (e.g., a randomly selected predictive entity, a predictive entity that is selected using one or more predictive entity selection rules, and/or the like) from the m predictive entities is used to generate the target intervention condition likelihood vector for the target intervention.

In some embodiments, when a target intervention is associated with m predictive entities, then m condition likelihood similarity/distance measures are determined for the target intervention and another predictive entity (e.g., where each condition likelihood similarity/distance measure is determined based at least in part on a corresponding condition likelihood vector for a corresponding predictive entity of the m predictive entities and the condition likelihood vector for the other predictive entity), and then the m condition likelihood similarity/distance measures are combined (e.g., summed up, averaged, and/or the like) to generate a condition likelihood similarity/distance measure for the target intervention and the other predictive entity. In some embodiments, when a target intervention is associated with m predictive entities, then m condition likelihood similarity/distance measures are determined for the target intervention and another predictive entity (e.g., where each condition likelihood similarity/distance measure is determined based at least in part on a corresponding condition likelihood vector for a corresponding predictive entity of the m predictive entities and the condition likelihood vector for the other predictive entity), and condition likelihood similarity/distance measure for the target intervention and the other predictive entity is determined based at least in part on a lowest condition likelihood distance measure of the m condition likelihood distance measures and/or based at least in part on a highest condition likelihood similarity measure of the m condition likelihood similarity measures.

At step/operation 603, the predictive data analysis computing entity 106 determines a condition likelihood similarity measure for the predictive entity based at least in part on a similarity measure for the condition likelihood vector for the predictive entity and the target intervention condition likelihood vector. While various embodiments of the present invention are described herein with respect to condition likelihood similarity measures and cross-temporal similarity measures, a person of ordinary skill in the relevant technology will recognize that various embodiments of the present invention may use condition likelihood distance measures in addition to or instead of condition likelihood similarity measures, and/or may use cross-temporal distance measures in addition to and/or instead of cross-temporal similarity measures.

In some embodiments, given a condition likelihood vector Pu for a predictive entity and a target intervention condition likelihood vector Pm for a target intervention, the condition likelihood similarity measure for the predictive entity with respect to the target intervention may be determined based at least in part on the output of the equation $SM=|\Sigma_j W_j(Pu_j-Pm_j)|$, where SM is the condition likelihood similarity measure, j iterates over values of the condition likelihood vector Pu for a predictive entity and the target intervention condition likelihood vector Pm (thus, iterates from one to n, with n being the number of n predictive input conditions and thus the size of both the condition likelihood vector for the predictive entity and the target intervention condition likelihood vector for the target intervention), $W_j$ is a precomputed/preconfigured/trained weight for the jth predictive input condition, $Pu_j$ is the condition likelihood score of the condition likelihood vector for the predictive entity with respect to the jth predictive input condition, and $Pm_j$ is the condition likelihood score of the target intervention condition likelihood vector for the target intervention with respect to the jth predictive input condition.

At step/operation 604, the predictive data analysis computing entity 106 determines the intervention relatedness measure for the predictive entity based at least in part on the condition likelihood similarity measure for the predictive entity and the cross-temporal similarity measure for the predictive entity. In some embodiments, the predictive data analysis computing entity 106 determines the intervention relatedness measure for the predictive entity based at least in part on a combination (e.g., summation, averaging, and/or the like) of the condition likelihood similarity measure for the predictive entity and the cross-temporal similarity measure for the predictive entity. In some embodiments, the predictive data analysis computing entity 106 processes the condition likelihood similarity measure for the predictive entity and the cross-temporal similarity measure for the predictive entity using a similarity determination machine learning model (e.g., a similarity determination machine learning model comprising one or more fully connected neural network layers) to generate the intervention relatedness measure for the predictive entity.

At step/operation 503, the predictive data analysis computing entity 106 performs one or more prediction-based actions based at least in part on the intervention relatedness measure. In some embodiments, in response to determining that the intervention relatedness measure for a target intervention satisfies a intervention relatedness measure threshold, the target intervention is adopted as a recommended intervention, and one or more prediction-based actions are performed based at least in part on the recommended intervention. Examples of such prediction-based actions include: automatically scheduling medical appointments corresponding to the recommended intervention, automatically performing operational load balancing for resources (e.g., human resources, computing resources, network resources, and/or the like) of a nearby hospital for a patient/member predictive entity when the recommended intervention is a hospitalization-related recommended intervention, automatically generating one or more prescription requests when the recommended intervention is a medication-related recommended intervention.

In some embodiments, performing the one or more prediction-based actions comprises generating user interface data for a prediction output user interface that describes one or more intervention relatedness measures for one or more target interventions with respect to one or more predictive entities, where the user interface data may be used by a client computing entity 102 to present the prediction output user interface using a display device of the client computing entity 102. An operational example of such a prediction output user interface 800 is depicted in FIG. 8. As depicted in FIG. 8, each value of the depicted table in the prediction output user interface 800 describes the intervention relatedness measure for a target intervention that is determined using a horizontal attribute of the table cell with respect to a member predictive entity that is determined using a vertical attribute of the table cell.

By using the predictive inferences operations described above, various embodiments of the present invention improve operational efficiency of predictive data analysis systems that are configured to generate intervention relatedness measures for target interventions. For example, various embodiments of the present invention introduce techniques for generating reliable and efficient intervention relatedness measures for target interventions by using cross-temporal similarity measures for predictive entities and the target interventions. By using the noted techniques, the need for generating repeated queries for intervention relatedness measures for target interventions based at least in part on new input data is reduced, thus reducing operational load on predictive data analysis systems that are configured to generate intervention relatedness measures for target interventions, improving the operational efficiency of the noted predictive data analysis, and making important technical contributions to the field of predictive data analysis.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining an intervention relatedness measure for a predictive entity with respect to a target intervention, the computer-implemented method comprising: identifying, by one or more processors, an ordered sequence of one or more event codes associated with the predictive entity; determining, by the one or more processors and a cross-temporal encoding machine learning model and based at least in part on the ordered sequence, a cross-temporal encoding of the predictive entity based at least in part on the ordered sequence; determining, by the one or more processors and based at least in part on the cross-temporal encoding of the predictive entity and a target intervention cross-temporal encoding for the target intervention, a cross-temporal similarity measure for the predictive entity; determining, by the one or more processors and based at least in part on the cross-temporal similarity measure, the intervention relatedness measure; and performing, by the one or more processors, one or more prediction-based actions based at least in part on the intervention relatedness measure, wherein performing the one or more prediction-based actions comprises: determining whether the intervention relatedness measure satisfies an intervention relatedness measure threshold; and in response to determining that the intervention relatedness measure satisfies the intervention relatedness measure threshold, performing the one or more prediction-based actions based at least in part on a clinical intervention associated with the target intervention.

2. The computer-implemented method of claim 1, wherein determining the cross-temporal encoding comprises: determining, using the cross-temporal encoding machine learning model and based at least in part on the ordered sequence, a cross-temporal encoding update for the predictive entity; and determining the cross-temporal encoding based at least in part on the cross-temporal encoding update and a prior cross-temporal encoding for the predictive entity.

3. The computer-implemented method of claim 1, wherein determining the target intervention cross-temporal encoding comprises: determining, using the cross-temporal encoding machine learning model and based at least in part on a target intervention ordered sequence of one or more target intervention event codes associated with a target intervention predictive entity for the target intervention, the target intervention cross-temporal encoding.

4. The computer-implemented method of claim 1, wherein determining the intervention relatedness measure further comprises: identifying a condition likelihood vector for the predictive entity, wherein the condition likelihood vector describes n condition likelihood scores for the predictive entity with respect to n defined predictive input conditions; identifying a target intervention condition likelihood vector for a target intervention predictive entity that is associated with the target intervention, wherein the target intervention condition likelihood vector describes n target intervention condition likelihood scores for the target intervention predictive entity with respect to the n defined predictive input conditions; determining a condition likelihood similarity measure for the predictive entity based at least in part on the condition likelihood vector and the target intervention condition likelihood vector; and determining the intervention relatedness measure based at least in part on the condition likelihood similarity measure.

5. The computer-implemented method of claim 1, wherein generating the cross-temporal encoding machine learning model comprises: identifying one or more training predictive entities, wherein each training predictive entity is associated with a training predictive entity ordered sequence of training predictive entity event codes and a historical target intervention label; for each training predictive entity of the one or more training predictive entities: determining an inferred cross-temporal encoding using the cross-temporal encoding machine learning model, determining, using a target intervention classification machine learning model and based at least in part on the inferred cross-temporal encoding, an inferred target intervention prediction for the training predictive entity, and determining a per-entity training measure for the training predictive entity based at least in part on the inferred target intervention prediction for the training predictive entity and the historical target intervention label for the training predictive entity; and updating one or more trainable parameters of the cross-temporal encoding machine learning model based at least in part on each per-entity training measure.

6. The computer-implemented method of claim 5, wherein: the one or more event codes comprise one or more diagnosis/procedure codes associated with the predictive entity, and the ordered sequence is determined based at least in part on clinical history data associated with the training predictive entity.

7. A system for determining an intervention relatedness measure for a predictive entity with respect to a target intervention, the system comprising one or more processors and memory including program code, the memory and the program code configured to, with the one or more processors, cause the system to at least: identify an ordered sequence of one or more event codes associated with the predictive entity; determine, using a cross-temporal encoding machine learning model and based at least in part on the ordered sequence, a cross-temporal encoding of the predictive entity based at least in part on the ordered sequence; determine, based at least in part on the cross-temporal encoding of the predictive entity and a target intervention cross-temporal encoding for the target intervention, a cross-temporal similarity measure for the predictive entity; determine, based at least in part on the cross-temporal similarity measure, the intervention relatedness measure; and perform one or more prediction-based actions based at least in part on the intervention relatedness measure, wherein performing the one or more prediction-based actions comprises: determining whether the intervention relatedness measure satisfies an intervention relatedness measure threshold; and in response to determining that the intervention relatedness measure satisfies the intervention relatedness measure threshold, performing the one or more prediction-based actions based at least in part on a clinical intervention associated with the target intervention.

8. The system of claim 7, wherein to determine the cross-temporal encoding the memory and the program code are further configured to, with the one or more processors, cause the system to: determine, using the cross-temporal encoding machine learning model and based at least in part on the ordered sequence, a cross-temporal encoding update for the predictive entity; and determine the cross-temporal encoding based at least in part on the cross-temporal encoding update and a prior cross-temporal encoding for the predictive entity.

9. The system of claim 7, wherein to determine the target intervention cross-temporal encoding the memory and the program code are further configured to, with the one or more processors, cause the system to: determine, using the cross-temporal encoding machine learning model and based at least in part on a target intervention ordered sequence of one or more target intervention event codes associated with a target intervention predictive entity for the target intervention, the target intervention cross-temporal encoding.

10. The system of claim 7, wherein to determine the intervention relatedness measure the memory and the program code are further configured to, with the one or more processors, cause the system to: identify a condition likelihood vector for the predictive entity, wherein the condition likelihood vector describes n condition likelihood scores for the predictive entity with respect to n defined predictive input conditions; identify a target intervention condition likelihood vector for a target intervention predictive entity that is associated with the target intervention, wherein the target intervention condition likelihood vector describes n target intervention condition likelihood scores for the target intervention predictive entity with respect to the n defined predictive input conditions; determine a condition likelihood similarity measure for the predictive entity based at least in part on the condition likelihood vector and the target intervention condition likelihood vector; and determine the intervention relatedness measure based at least in part on the condition likelihood similarity measure.

11. The system of claim 7, wherein to generate the cross-temporal encoding machine learning model the memory and the program code are further configured to, with the one or more processors, cause the system to: identify one or more training predictive entities, wherein each training predictive entity is associated with a training predictive entity ordered sequence of training predictive entity event codes and a historical target intervention label; for each training predictive entity of the one or more training predictive entities: determine an inferred cross-temporal encoding using the cross-temporal encoding machine learning model, determine, using a target intervention classification machine learning model and based at least in part on the inferred cross-temporal encoding, an inferred target intervention prediction for the training predictive entity, and determine a per-entity training measure for the training predictive entity based at least in part on the inferred target intervention prediction for the training predictive entity and the historical target intervention label for the training predictive entity; and updating one or more trainable parameters of the cross-temporal encoding machine learning model based at least in part on each per-entity training measure.

12. The system of claim 11, wherein: the one or more event codes comprise one or more diagnosis/procedure codes associated with the predictive entity, and the ordered sequence is determined based at least in part on clinical history data associated with the training predictive entity.

13. A computer program product for determining an intervention relatedness measure for a predictive entity with respect to a target intervention, the computer program product comprising at least one non-transitory computer readable storage medium having computer-readable program code portions stored therein, the computer-readable program code portions configured, when executed by one or more processors, to: identify an ordered sequence of one or more event codes associated with the predictive entity; determine, using a cross-temporal encoding machine learning model and based at least in part on the ordered sequence, a cross-temporal encoding of the predictive entity based at least in part on the ordered sequence; determine, based at least in part on the cross-temporal encoding of the predictive entity and a target intervention cross-temporal encoding for the target intervention, a cross-temporal similarity measure for the predictive entity; determine, based at least in part on the cross-temporal similarity measure, the intervention relatedness measure; and perform one or more prediction-based actions based at least in part on the intervention relatedness measure, wherein performing the one or more prediction-based actions comprises: determining whether the intervention relatedness measure satisfies an intervention relatedness measure threshold; and in response to determining that the intervention relatedness measure satisfies the intervention relatedness measure threshold, performing the one or more prediction-based actions based at least in part on a clinical intervention associated with the target intervention.

14. The computer program product of claim 13, wherein to determine the cross-temporal encoding the computer-readable program code portions are further configured, when executed by one or more processors, to: determine, using the cross-temporal encoding machine learning model and based at least in part on the ordered sequence, a cross-temporal encoding update for the predictive entity; and determine the cross-temporal encoding based at least in part on the cross-temporal encoding update and a prior cross-temporal encoding for the predictive entity.

15. The computer program product of claim 13, wherein to determine the target intervention cross-temporal encoding the computer-readable program code portions are further configured, when executed by one or more processors, to: determine, using the cross-temporal encoding machine learning model and based at least in part on a target intervention ordered sequence of one or more target intervention event codes associated with a target intervention predictive entity for the target intervention, the target intervention cross-temporal encoding.

16. The computer program product of claim 13, wherein to determine the intervention relatedness measure the computer-readable program code portions are further configured, when executed by one or more processors, to: identify a condition likelihood vector for the predictive entity, wherein the condition likelihood vector describes n condition likelihood scores for the predictive entity with respect to n defined predictive input conditions; identify a target intervention condition likelihood vector for a target intervention predictive entity that is associated with the target intervention, wherein the target intervention condition likelihood vector describes n target intervention condition likelihood scores for the target intervention predictive entity with respect to the n defined predictive input conditions; determine a condition likelihood similarity measure for the predictive entity based at least in part on the condition likelihood vector and the target intervention condition likelihood vector; and determine the intervention relatedness measure based at least in part on the condition likelihood similarity measure.

17. The computer program product of claim 13, wherein to generate the cross-temporal encoding machine learning model the computer-readable program code portions are further configured, when executed by one or more processors, to: identify one or more training predictive entities, wherein each training predictive entity is associated with a training predictive entity ordered sequence of training predictive entity event codes and a historical target intervention label; for each training predictive entity of the one or more training predictive entities: determine an inferred cross-temporal encoding using the cross-temporal encoding machine learning model, determine, using a target intervention classification machine learning model and based at least in part on the inferred cross-temporal encoding, an inferred target intervention prediction for the training predictive entity, and determine a per-entity training measure for the training predictive entity based at least in part on the inferred target intervention prediction for the training predictive entity and the historical target intervention label for the training predictive entity; and updating one or more trainable parameters of the cross-temporal encoding machine learning model based at least in part on each per-entity training measure.

18. The computer program product of claim 17, wherein: the one or more event codes comprise one or more diagnosis/procedure codes associated with the predictive entity, and the ordered sequence is determined based at least in part on clinical history data associated with the training predictive entity.

\* \* \* \* \*